(12) United States Patent
Narayanam et al.

(10) Patent No.: US 10,585,612 B2
(45) Date of Patent: Mar. 10, 2020

(54) OPTIMIZED SEQUENTIAL WRITES ON MIRRORED DISKS

(71) Applicant: INTERNATIONAL BUSINESS MACHINES CORPORATION, Armonk, NY (US)

(72) Inventors: Krishnasuri Narayanam, Bangalore (IN); Sarvesh Patel, Pune (IN); Sachin C. Punadikar, Pune (IN); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 15/861,862

(22) Filed: Jan. 4, 2018

(65) Prior Publication Data

US 2019/0205055 A1  Jul. 4, 2019

(51) Int. Cl.
*G06F 12/00* (2006.01)
*G06F 3/06* (2006.01)
*G06F 11/14* (2006.01)

(52) U.S. Cl.
CPC ............ *G06F 3/0641* (2013.01); *G06F 3/061* (2013.01); *G06F 3/065* (2013.01); *G06F 3/067* (2013.01); *G06F 3/0608* (2013.01); *G06F 3/0689* (2013.01); *G06F 11/14* (2013.01)

(58) Field of Classification Search
CPC ...... G06F 3/0641; G06F 11/14; G06F 3/0608; G06F 3/067; G06F 3/061; G06F 3/0689; G06F 3/065
USPC .......................................................... 711/114
See application file for complete search history.

(56) References Cited

U.S. PATENT DOCUMENTS

| | | |
|---|---|---|
| 7,814,149 B1 | 10/2010 | Stringham |
| 8,176,277 B2 | 5/2012 | Bricker et al. |
| 9,020,900 B2 | 4/2015 | Vijayan Retnamma et al. |
| 9,110,914 B1 | 8/2015 | Frank et al. |
| 9,633,033 B2 | 4/2017 | Vijayan et al. |
| 2011/0029497 A1* | 2/2011 | Benhase ............... G06F 3/0608 707/698 |
| 2013/0325821 A1* | 12/2013 | Amit ................... G06F 11/1453 707/692 |
| 2014/0006362 A1* | 1/2014 | Noronha ............... G06F 3/0641 707/692 |
| 2014/0201170 A1 | 7/2014 | Vijayan et al. |
| 2016/0078068 A1 | 3/2016 | Agrawal et al. |
| 2016/0266828 A1 | 9/2016 | Vijayan et al. |
| 2019/0205055 A1* | 7/2019 | Narayanam ........... G06F 3/0641 |

* cited by examiner

*Primary Examiner* — Mardochee Chery
(74) *Attorney, Agent, or Firm* — Griffiths & Seaton PLLC

(57) ABSTRACT

Embodiments for optimizing sequential write operations in a data deduplication environment by one or more processors. Similar data deduplication signatures for stored data at all storage devices in one or more storage systems may be maintained. A deduplication signature associated with a write operation at a storage device may be compared to the similar data deduplication signatures. Results of the comparison with each of the other storage devices may be shared prior to performing the write operation.

18 Claims, 7 Drawing Sheets

OPTIMIZED SEQUENTIAL WRITES ON MIRRORED DISKS

BACKGROUND OF THE INVENTION

Field of the Invention

The present invention relates in general to computing systems, and more particularly to, various embodiments for optimizing sequential write operations in a data deduplication and/or data mirroring computing environment by one or more processors.

Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for optimizing sequential write operations in a data deduplication and/or data mirroring computing environment by one or more processors are provided. In one embodiment, by way of example only, a method for optimizing sequential write operations in a data deduplication and/or data mirroring computing environment, again by one or more processors, is provided. Similar data deduplication signatures for stored data may be maintained at all storage devices in one or more storage systems. A deduplication signature associated with a write operation at a storage device may be compared to the similar data deduplication signatures. Results of the comparison with each of the other storage devices may be shared prior to performing the write operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
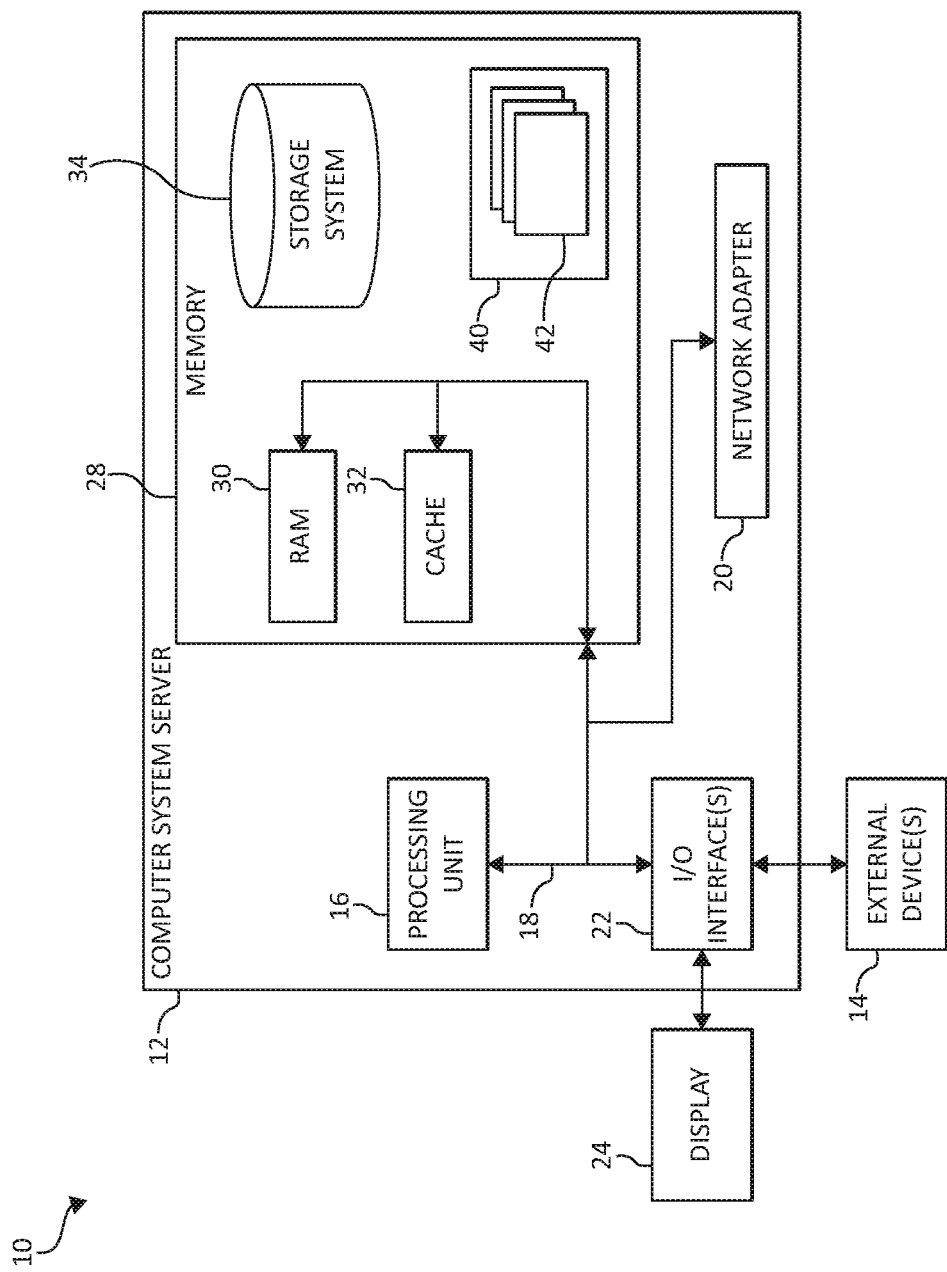
FIG. 1 is a block diagram depicting an exemplary computing node according to an embodiment of the present invention.

In today's data processing environment, computer storage systems may employ a number of different methods to perform storage operations on data. For example, data may be deduplicated or mirrored. Mirroring is a form of RAID (Redundant Array of Independent Disks) and is often referred to as RAID-1. Mirroring is implemented by storing two or more copies of data on two or more different disks. Data may be read from any of the disks on which it is stored, so long as the disk is available. Maintaining multiple copies of data increases the availability of the data and decreases the possibility that data will be lost due to memory failure, disk failure, or other hardware problem.

Data deduplication refers to the reduction and/or elimination of redundant data. Said differently, data deduplication is a specialized data compression technique for eliminating duplicate copies of repeating data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. Related and somewhat synonymous terms to deduplication is intelligent (data) compression and single-instance (data) storage. This technique is used to improve storage utilization and can also be applied to network data transfers to reduce the number of bytes that must be sent.

In the deduplication process, unique chunks of data, or byte patterns, may be identified and stored during a process of analysis. As the analysis continues, other data chunks may be compared to the stored copy and whenever a match occurs, the redundant chunk may be replaced with a small reference that points to the stored chunk. Given that the same byte pattern may occur multiple times (and the data matching frequency may be dependent on a data chunk size), the amount of data that is to be stored and/or transferred can be greatly reduced.

Data mirroring and replication are the techniques of transferring data between storage subsystem types, formats, or computer systems to achieve redundancy. These data storage systems can be single storage systems, multiple storage systems, similar storage systems, and/or dissimilar storage systems. Migration, mirroring and/or replication may be performed under control of a computing application so as to make movement of data as complete and as automated as is possible.

Data mirroring may be needed in cases of disasters or when changing computer systems or upgrading to new computing applications. As with any data center change, avoiding disruption or disabling active applications is critical. It may be desirable to replicate data for reasons of redundancy, resolving performance issues, employing data mirroring or replication operations so as to implement a disaster recovery solution, requiring new functions and facilities offered by evolving technology for maintaining or achieving increased computing efficiencies, and/or for relocating a data center. In addition, maintaining and achieving computing efficiency and performance is a tedious operation when data mirroring is enabled for write data requests, since the data needs to be written on both the copies successfully. Also, only the write operations may be acknowledged in data mirroring or synchronous data replication operations. If any one of the storage systems (e.g., data mirroring or data deduplication) is underperforming, the overall performance of the storage system may be compromised. The performance of the storage system may be governed by feature functions such as, for example, compression and data deduplication. These features improve on storage space utilization, but increase the time required to perform write/read operations.

Accordingly, the present invention provides a solution to improve sequential write performance when data is being written to mirrored or replicated disks while data deduplication is involved. Accordingly, various embodiments are provided for optimizing sequential write operations in a data deduplication and/or data mirroring computing environment by one or more processors. In one embodiment, by way of example only, a method for optimizing sequential write operations in a data deduplication and/or data mirroring computing environment, again by one or more processors, is provided. Similar data deduplication signatures for stored data at all storage devices in one or more storage systems may be maintained. A deduplication signature associated with a write operation at a storage device may be compared to the similar data deduplication signatures. Results of the comparison with each of the other storage devices may be shared prior to performing the write operation.

Said differently, the present invention provides for improving the performance of sequential write operations on mirrored disks at remote locations by associating a signature to a write operation and comparing the signature with deduplication signatures of data chunks previously stored in the mirrored disks. Similar deduplication signatures may be maintained across all mirrored disks (parallel deduplication) for comparing the write request with a single mirrored disk and sharing the result with all other mirrored disks before performing the write operation. The write operation may be performed (in parallel) on all mirrored disks when the mirrored disks are associated with dissimilar deduplication signatures by calculating the signature of the mirrored disk with a larger chunk size (as compared to mirrored disks with smaller chunk sizes) and sharing the signature with other disks.

In one aspect, in a data deduplication and data mirroring computing storage environment (e.g., a storage system), a fingerprint of a write operation for data from a source system to a target system may be calculated and an early lookup operation may be commenced on the target system (prior to receiving the write data). This system (e.g., each target storage system) will be made aware of data chunk size used by the other De-dupe system. While performing the WRITE operation, the system (e.g., a target storage system or source storage system depending on data chuck size) with larger chuck size will calculate the fingerprint for the system with small data chunk size and will pass on the fingerprint information it has calculated to the other system. The other system (e.g., the target storage system) will do the required comparison before the actual write operation is being asked by the host (e.g., the source storage system).

Moreover, applying deduplication (for storage savings) on the mirrored disks of RAID-1 with parallel write operations may compromise performance. If write operation performance is more critical than computing efficiency in a storage system with mirrored disks of RAID-1, applying deduplication on these storage disks should be avoided. Thus, in data storage systems, there is a tradeoff between write operation performances as compared to storage savings with mirrored disks of RAID-1 involving parallel write operations on the mirrored disks. With sequential write operations (that may be preferred over parallel write operations when data security and safety is preferred over the speed of the write operation), without compromising WRITE performance, the present invention enables disk deduplication on the mirrored disks. In so doing, the first disk on which the sequential write operation is performed may be a non-deduplicated storage device/disk. All other mirrored disks, on which the write operation occurs at a later point of time, may include data deduplication operations.

In one aspect, an input/output ("I/O") scheduler may require one or more changes. For example, for a RAID-1 sequential write operation to one or more mirrored disks, the order of write operations on the mirrors becomes irrelevant (e.g., with disk 1 and disk 2 being the mirrors, a write on disk 1 may follow and precede a write on disk 2). With RAID-1 sequential write operations on mirrors with deduplication, it may be assumed that the mirror 'disk 2' (e.g., a second mirrored disk) is deduplicated. The I/O scheduler may then issue the I/O in the order of: write on disk 1 and precede to write on disk 2. Such ordering may also be used in a data replication scenario. In the event of synchronous data replication operations, two or more storage systems may complete a write operation and then an acknowledgement may be sent to a host system which issued the write operation. In this case, the write operation performance on the second storage system/site may be improved as the signature calculations may be already provided by the first storage system/site prior to writing the actual data on the second storage system/site.

It should be noted that for different deduplication block sizes at different sites, calculating a deduplication signature at a first storage system site ("site-1") and then sending the deduplication signature to a second storage system site ("site-2") is faster (in terms of computation time) and more efficient than doing it directly on the second storage system site ("site-2") because of the following. First, there are two types of deduplication, fixed length and variable length deduplication. For different deduplication block size (i.e., variable length deduplication), the deduplication signature calculated at site-1 will be used to look up and match variable length deduplication fingerprints on site-2. This will reduce the lookup time when the actual data has not been received at site-2. Second, there are two types of system implementations—"active-active" or "active-passive"— where production and disaster recover ("DR") sites may be referred. In active-passive, the active system assumes all the workload, but when the active system fails, the passive system becomes active and assumes the full workload. In active-active implementations, all storage sites may be equally handling the I/O load (e.g., equally sharing the workload) and still act as a disaster recovery ("DR") site for each other. Thus, since an active site (e.g., production site) may also be a DR site for each other, the present invention calculates the deduplication signature at site-1 (which may be both a production site and/or a DR site) and then sends the deduplication signature to site-2, which may be a production site and/or a DR site.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
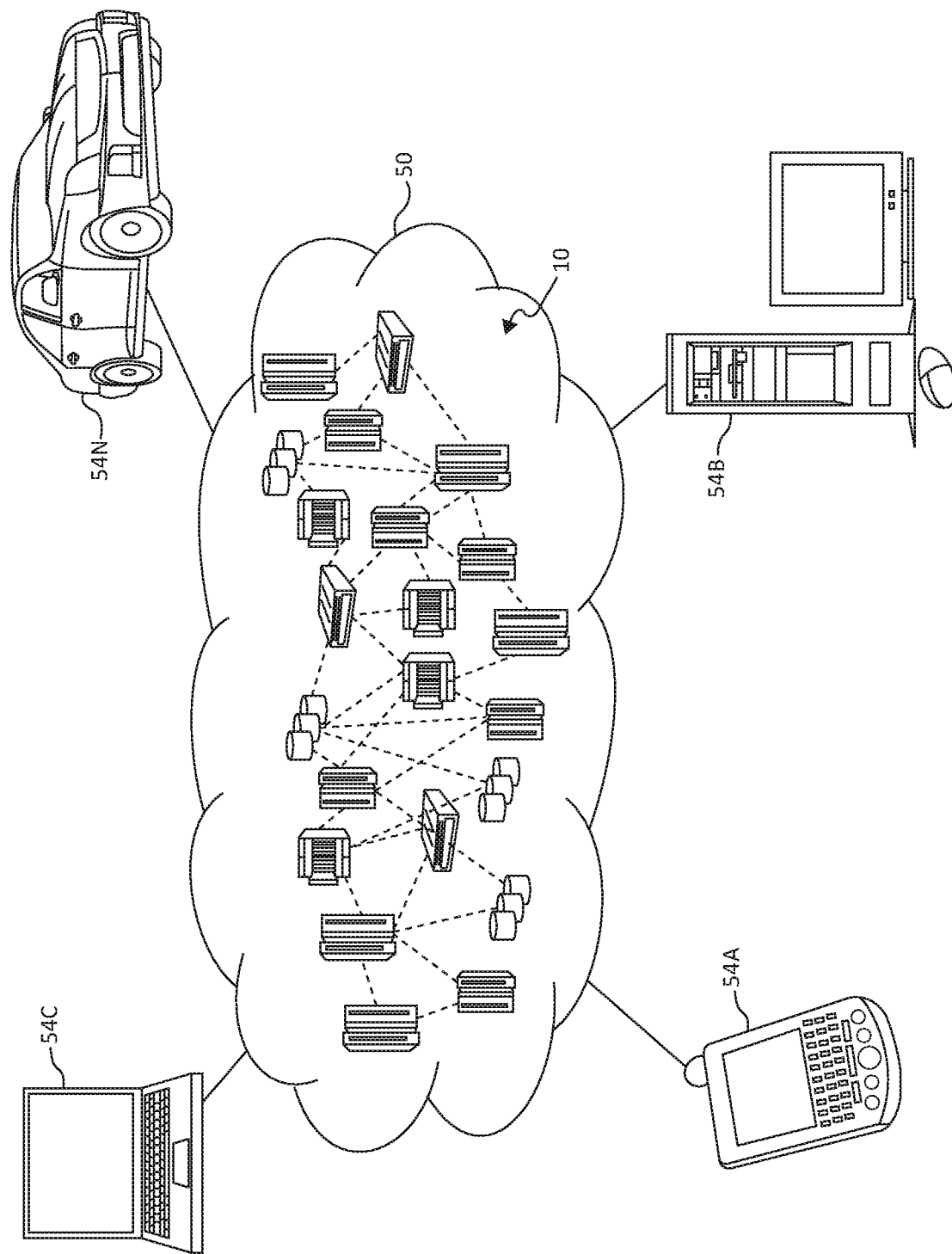
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
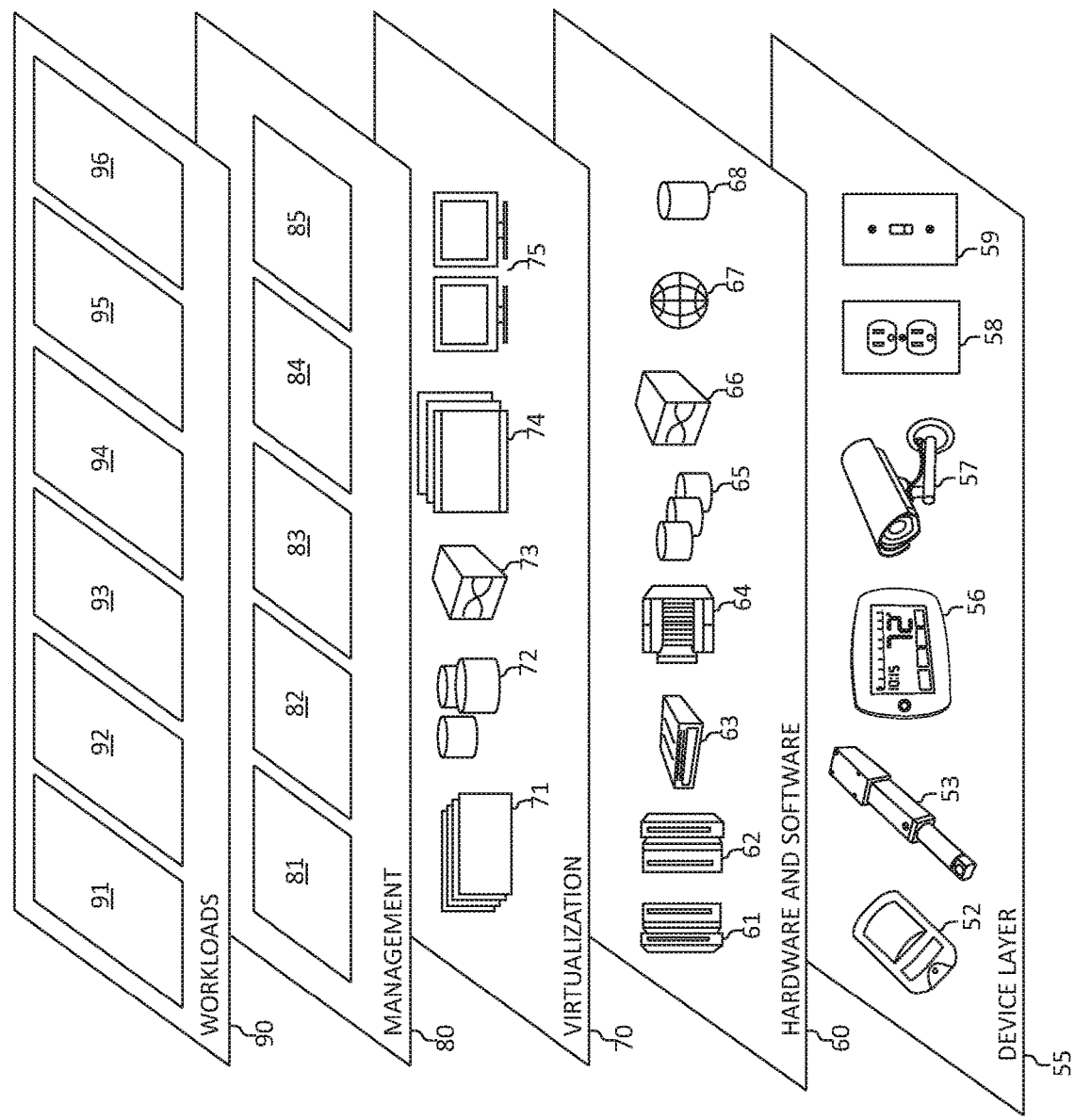
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various optimizing sequential write operation workloads and functions 96. In addition, optimizing sequential write operation workloads and functions 96 may include such operations as data analytics, data analysis, and as will be further described, notification functionality. One of ordinary skill in the art will appreciate that the optimizing sequential write operation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the present invention may perform data deduplication by calculating a deduplication signature ("fingerprint") of a data chunk. The deduplication signature information may be stored in a deduplication map. Whenever there is a write operation, a deduplication signature ("fingerprint") of the incoming data chunk may be calculated and compared with the deduplication map (e.g., deduplication signatures stored in the map). If a match is found, the redundant data chunk may be replaced with a small reference that points to the stored data chunk.

In one aspect, for performing the write operation, the present invention may first select, if available, a non-deduplicated disk to write the data. In a similar deduplicated system, the calculated fingerprint may be transferred from a first deduplication system to a second deduplication system for fast comparison (of the deduplication signatures) prior to receiving the actual data (as part of sequential write). The receiving deduplication storage system may perform a required comparison and next action plan by the time the receiving deduplication storage system is requested to actually perform the write operation. If the involved storage systems are dissimilar deduplicated systems, then the write operation may be performed first on the storage system with larger data chunk size. The deduplication storage system with larger data chunk size will be made aware of (e.g., using small computer system interface "SCSI" commands) data chunk size used by the other De-dupe system. While performing write operation, the deduplication storage system with larger data chunk size may calculate the data signature (e.g., fingerprint) for the deduplication storage system with a small data chunk size. The deduplication storage system with larger data chunk size may pass the data signature (e.g., fingerprint) information it has calculated to the deduplication storage system with the small data chunk size. The deduplication storage system with the small data chunk size may also perform the required data signature comparisons (between the calculated data signature for the write operation and the deduplication map of stored data) prior to performing the write operation requested by a host system.

Thus, the mechanisms of the illustrated embodiments improve write data performance in one or more storage systems where data is mirrored and/or replicated in synchronous copies such as, for example, metro mirroring and/or data deduplication operations that may be enabled on the storage systems. In one aspect, a deduplication map, containing the deduplication signatures (and/or fingerprints) for stored data, may be shared across the one or more storage systems so as to enable a remote or partner storage system to receive a deduplication fingerprint before the actual data is received. The remote or partner storage system may identify matching or similar deduplicated blocks once the data is received at the remote site.

Accordingly, the present invention provides awareness of a deduplication map to a target storage controller of a data mirroring or replication operation. Data may be migrated when an input/output ("I/O") request to a data block is received from a host application. The deduplication map may be generated consisting of data blocks and/or extents to track the deduplication. If, for example, a majority of the blocks are copies (e.g., over 50, 75, or 80%) then actual data movement across storage sites and/or storage systems may be improved. Also, write data performance may also be improved in data mirroring environments and/or within data replication environments. That is, in this case, if the data to be copied from a source storage system to a target storage system is highly deduplicated and the deduplication map is available, the deduplication map may be shared. Thus, the copy operations between source and target can be completed in a lesser amount of time.

With RAID-1 sequential write operations on deduplication disks (e.g., mirrored disks) with deduplication, an I/O scheduler should first issue the I/O on a non-deduplication disk if available (e.g., some of the mirrored disks are not deduplicated) so as to improve the sequential write performance. If all the mirrored disks have the same/similar deduplication map, the deduplication signature (e.g., fingerprint and/or data block checksum) calculated by the first deduplication mirrored disk during the write operation may be transferred for the data block of the write request to each remaining deduplication disk (e.g., mirrored disks) in the sequential write operation.

If all the deduplication disks (e.g., mirrored disks) do not have the same de-duplication map (deduplication is not done globally across all mirrored disks), then while the write operation is performed on one or more mirrored disks (e.g., the non-deduplicated first disk), the write operation may be performed in parallel to each remaining disk of the sequential write operation without commit on the deduplication map (i.e., calculating the data block checksum or fingerprint, etc.). That is, without commit on the deduplication map means since the write operation, as used herein, refers to sequential writes, the final commit on each mirror disk or replicated disk may be performed in a serial manner only if the write operation is to be performed on multiple disks. The deduplication performance may be improved as the time required to deduplicate at the mirrored site is reduced.

If the other storage disks are using different deduplication block sizes, the first storage controller of a first storage system may calculate a deduplication signature as per a size of the second storage's deduplication chunk size and send the deduplication signature to the second storage system prior to sending the data, which will enable the second storage controller of a second storage system to identify, find, and/or locate the deduplicated data chunk and perform the write operation of the data more efficiently and in less time.

Figure 4A:
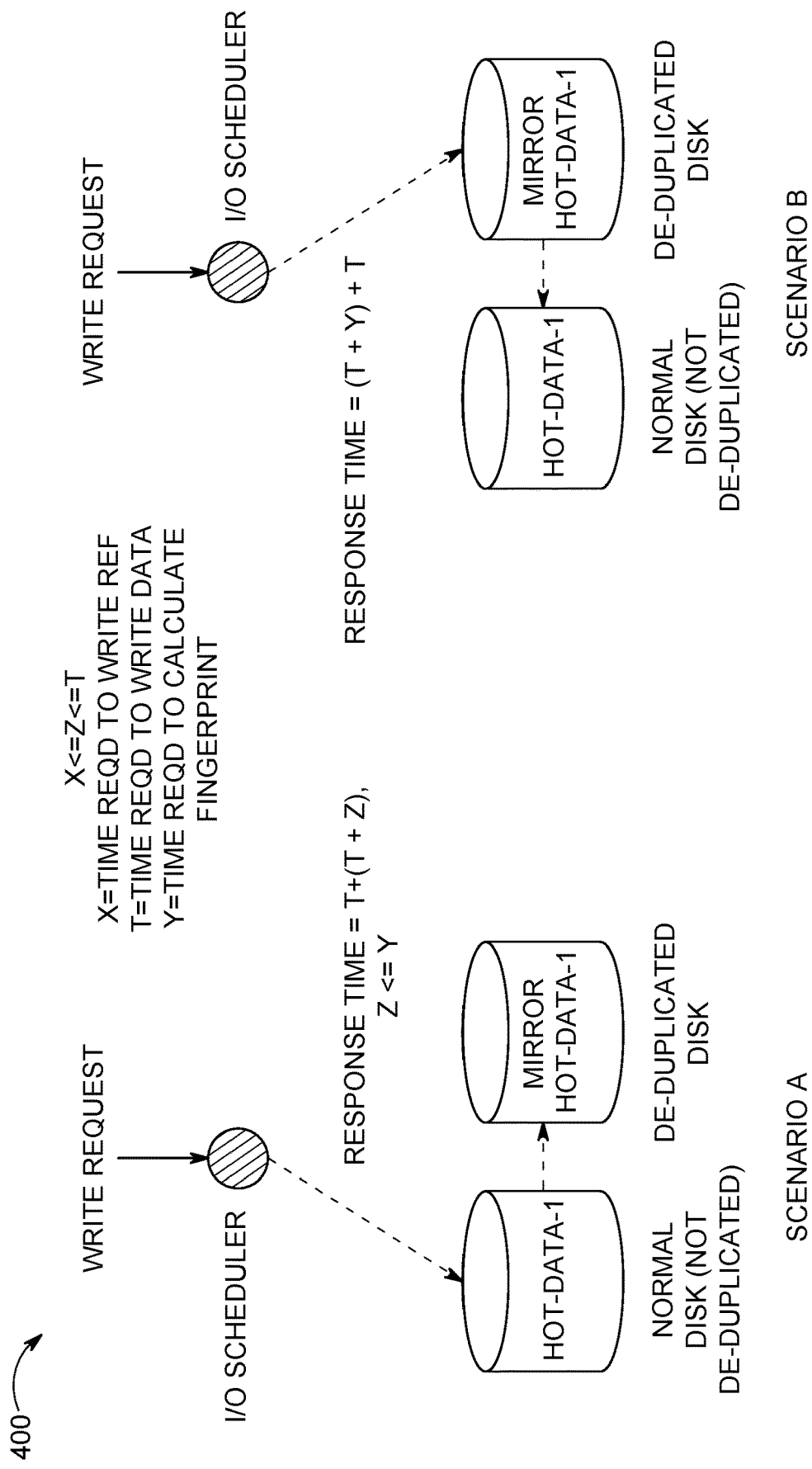
FIGS. 4A-4B are additional block diagrams depicting various user hardware and computing components functioning in accordance with aspects of the present invention.
Figure 4B:
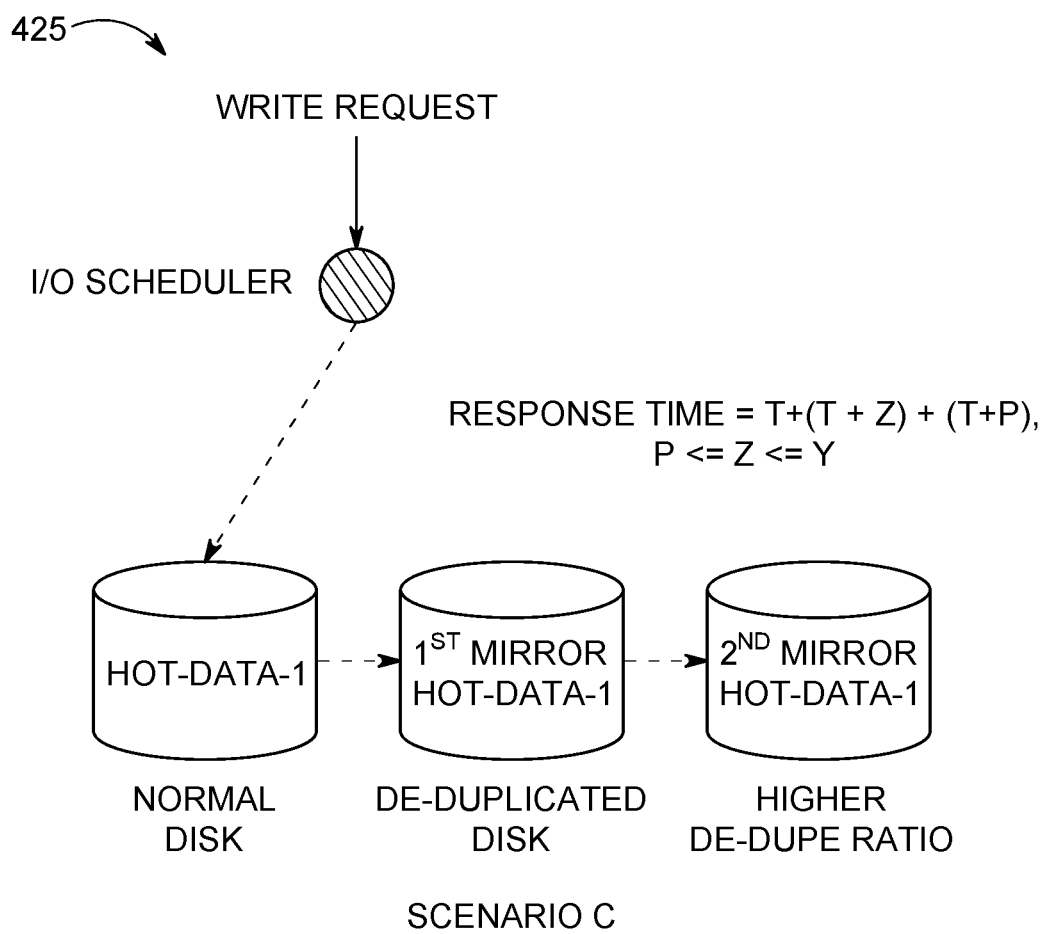

Turning now to FIGS. 4A-4B, block diagrams 400, 425 depict exemplary functional components 400 according to various mechanisms of the illustrated embodiments. As shown, the various functionality, or "modules" of functionality, hardware devices, and/or other components in the same descriptive sense as has been previously described in FIGS. 1-3 may be included in FIGS. 4A-4B. For example, processing unit 12 and memory 28 of FIG. 1 may be employed in FIGS. 4A-4B to perform various computational, data processing, storage and other functionality in accordance with various aspects of the present invention.

In operation, consider scenario A, B, and C of block diagrams 400, 425 depicting a write operation (e.g., a write request) that may be received by an I/O scheduler in a storage system. When a write request is received by the I/O scheduler to a mirrored disk as a sequential write operation, one of the mirrored disks may be a non-deduplicated disk and the other mirrored disk may be a deduplicated disk.

Scenario A of FIG. 4A illustrates sequential write operations on mirrored disks with the write operation of data (e.g., "hot data-1") being first performed on a non-deduplicated storage device (e.g., non-deduplicated storage disk (e.g., with "hot-data-1" that may be accessed frequently)). Time "T" may be the time taken for the write to be performed on the non-deduplicated storage device. While the write operation is occurring on the non-deduplicated storage device, the non-deduplicated storage device may calculate a deduplication signature (or fingerprint) of the data as per a chunk size being used on a deduplicated disk (e.g., disk 2). This deduplication signature information may be provided to the deduplicated disk before the actual data is sent to the deduplicated disk for writing. This deduplication signature information may be directly used on the deduplicated disk to decide whether to write the entire chunk (new data) or write reference to the existing data (duplicate data). Time "X" may be the time required to write the reference instead of writing the actual data on the deduplicated disk. Time "Y" may be the time required to calculate the deduplication signature information of the data chunk. Time "Z" may be an amount of time saved in the total write response time. Thus, time "Y" may always be required and a savings amount (e.g., savings of a time delay) of time "Z" (e.g., $X<=Z<=T$) may be included in the total write response time. The response time, as depicted in scenario A, may be equal to $T+(T+Z)$ where Z is less than or equal to Y.

Scenario B of FIG. 4A illustrates sequential write operations on mirrored disks by calculating a fingerprint calculation while performing the write operation on a deduplicated storage device (e.g., deduplicated storage disk). In Scenario B, the write operation may take a time "2t+y" for performing the write operation. It may be possible in scenario A of FIG. 4A to achieve an increase in computing efficiency (e.g., the write operation being time "2t" for new data or time "t+x") by determining/calculating the deduplication signature while performing the write operation to the non-deduplicated storage disk and conducting in parallel to the write-on-the-first-disk as explained. In scenario B of FIG. 4A, time "y" may be the time savings at the second site (e.g., deduplicated storage disk) due to sharing of the signature as per the second site requires. It should be noted that disk 1 may be a deduplicated disk or a non-deduplicated disk. For example, if disk 1 is deduplicated than disk 2 may also be deduplicated. The response time, as depicted in scenario B, may be equal to $(T+Y)+T$.

A deduplication ratio on a second mirrored disk (e.g., disk 2) could be more than the deduplication ratio on a first mirrored disk such as, for example, with a data chunk size being less on the second mirrored disk (e.g., disk 2), as illustrated in scenario C of FIG. 4B. The greater the deduplication ratio, the greater the amount of time it takes to calculate the fingerprint and complete the match. The lower the disk in the write order (e.g., lower means the disk which will be written last in the order of mirroring chain), the more time is available prior to a write operation occurring on that particular disk in the write order. Accordingly, the disk data with a greater deduplication ratio could have more time for being prepared with match findings, prior to the write operation occurring on that particular disk having the greater deduplication ratio. The response time, as depicted in scenario C of FIG. 4B, may be equal to $T+(T+Z)+(T+P)$ where P is less than or equal to Z and Z is less than or equal to Y.

Said differently, in one aspect, the deduplication ratio of the second mirrored disk may be lower than that of the first mirrored disk. In this case, the deduplication ratio is inversely proportional to the data chunk sizes (e.g., the smaller the data chunk size the larger the deduplication ratio). Thus, the deduplication ratio on the second mirrored disk may be more than the deduplication ratio on the first mirrored disk when the data chunk size is less on the second mirrored disk (e.g., disk 2). This means there are more numbers of data chunks to compare. A preferred scenario may be where the deduplication ratio on the second mirrored disk is greater than the deduplication ratio on the first mirrored disk. However, even if the deduplication ratio of the second mirrored disk is less than that of the deduplication ratio of the first mirrored disk, the time required to perform the lookup operation is still optimized, faster, and saved via the mechanisms of the illustrated embodiments.

It should also be noted that the I/O scheduler may operate as follows. With RAID-1 sequential write operations on mirrors with de-duplication, the I/O scheduler may issue the I/O first on a non-deduplicated storage disk (if some of the mirrored disks are not deduplicated to so as improve the sequential write performance).

For a required change in I/O scheduler, with RAID-1 sequential write operations to mirrors, the order of writes on the mirrors does not matter (e.g., "disk 1" and "disk 2" being the mirrors, write-on-disk 1 may follow and/or precede write-on-disk 2). With RAID-1 sequential write operations on mirrors with deduplication, it may be assumed that a second mirror (e.g., "disk 2") may be deduplicated. Then the I/O scheduler may issue the I/O in the order: write-on-disk 1 precedes write-on-disk 2. This can be used in the replication scenarios as well. In case of a synchronous replication scenario, two storage system sites may complete the write operation and then an acknowledgement may be sent to a host which issued the write operation. In this case, the write operation performance on a second site may be improved as the signature calculations are already provided by the first site before writing the actual data on the second site.

Figure 5:
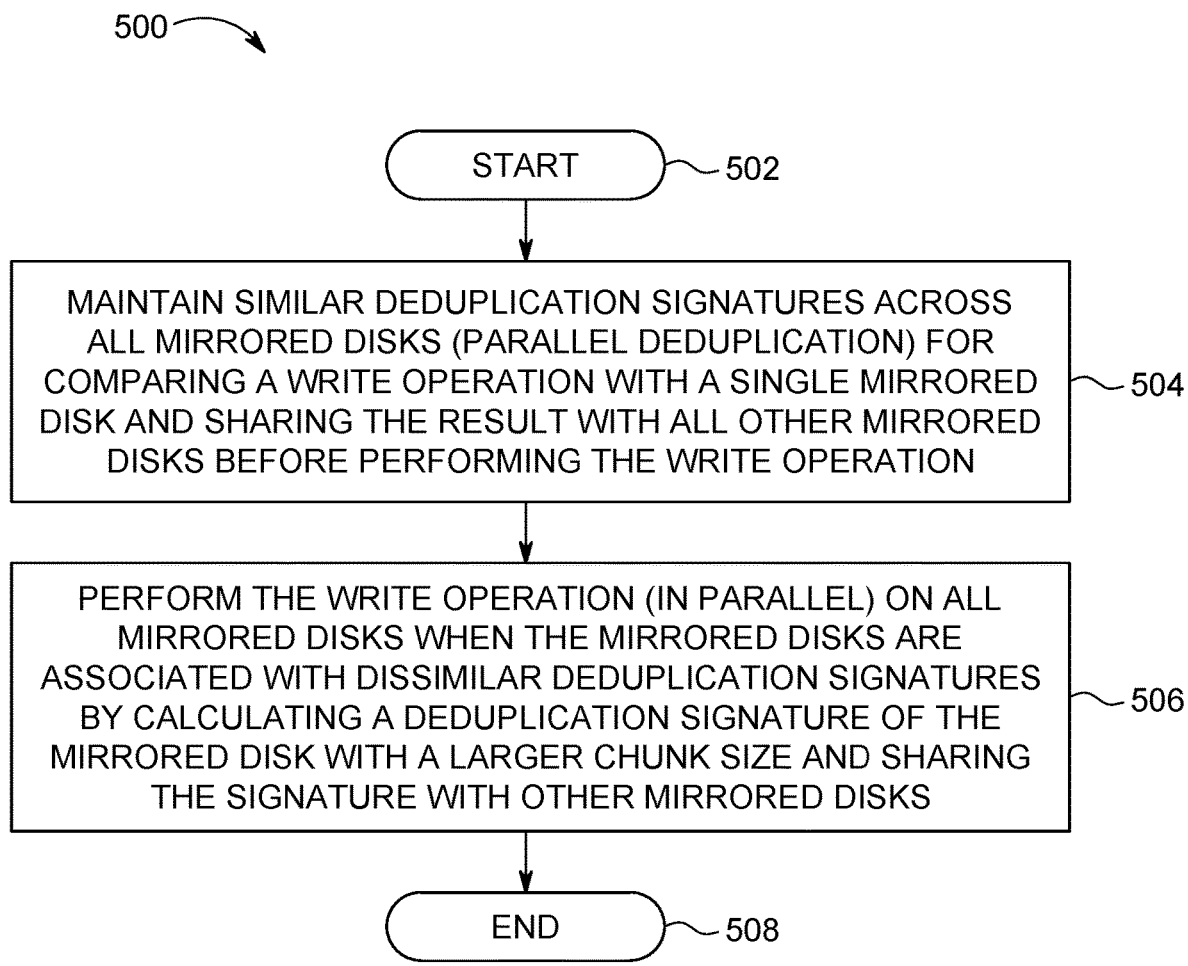
FIG. 5 is a flowchart diagram depicting an additional exemplary method for optimizing sequential write operations in a data deduplication and/or data mirroring environment by one or more processors, again in which aspects of the present invention may be realized.

Turning now to FIG. 5, a method 500 for optimizing sequential write operations in a data deduplication and/or data mirroring computing environment by one or more processors is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502. Similar deduplication signatures may be maintained across all mirrored disks (parallel deduplication) for comparing a write operation with a single mirrored disk and sharing the result with all other mirrored disks before performing the write operation, as in block 504. The write operation may be performed (in parallel) on all mirrored disks when the mirrored disks are associated with dissimilar deduplication signatures by calculating a deduplication signature of the mirrored disk with a larger chunk size and sharing the signature with other mirrored disks, as in block 506. The functionality 500 may end, as in block 508.

Figure 6:
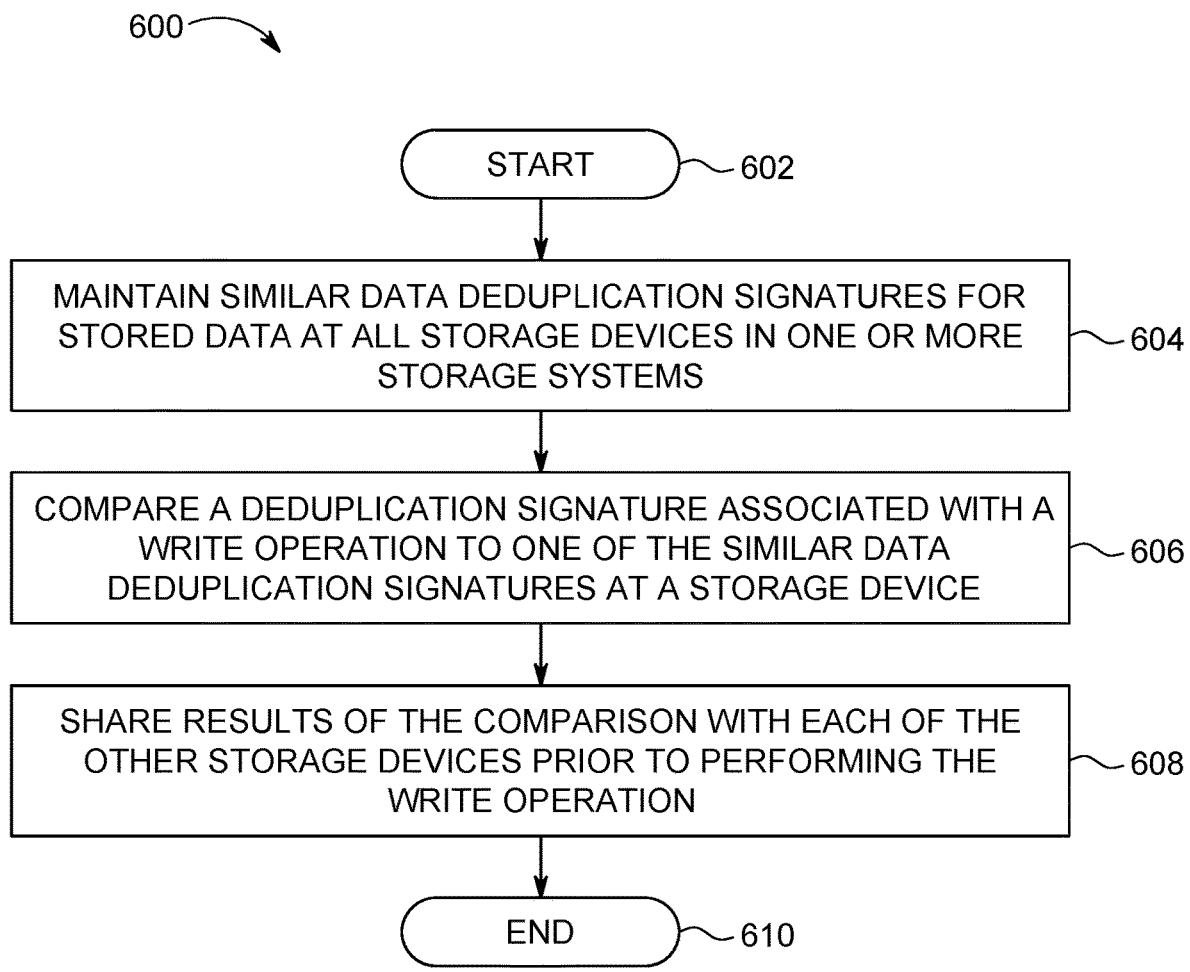
FIG. 6 is a flowchart diagram depicting an additional exemplary method for optimizing sequential write operations in a data deduplication and/or data mirroring environment by one or more processors, again in which aspects of the present invention may be realized.

Turning now to FIG. 6, a method 600 for optimizing sequential write operations in a data deduplication and/or data mirroring environment by one or more processors is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. Similar data deduplication signatures for stored data at all storage devices (e.g., mirrored disks) in one or more storage systems may be maintained, as in block 604. A deduplication signature associated with a write operation may be compared to one of the similar data deduplication signatures at a storage device (e.g., a single mirrored disk), as in block 606. Results of the comparison with each of the other storage devices may be shared prior to performing the write operation, as in block 608. The functionality 600 may end, as in block 610.

In one aspect, in conjunction with and/or as part of at least one block of FIG. 6, the operations of method 600 may include each of the following. The operations of method 600 may determine the deduplication signature for the write operation for comparison to the similar data deduplication signatures. The operations of method 600 may determine the deduplication signature for the write operation by the storage device having a largest data chunk size as compared to other storage devices having a smaller data chunk size.

In an additional aspect, the operations of method 600 may select a non-deduplicated storage disk to perform the write operation, and/or select a deduplicated storage disk to perform the write operation upon determining a non-deduplicated storage disk is unavailable. The operations of method 600 may perform the write operation on the storage device. More specifically, a write operation may be performed on a non-deduplicated storage device, a deduplicated storage device, or a combination of both the non-deduplicated storage device and the deduplicated storage device.

The operations of method 600 may transfer the deduplication signature while performing the write operation on the storage device to each of the storage devices prior to receiving data for performing a sequential write operation. The operations of method 600 may transfer the deduplication signature of the write request to each of the other storage devices prior to receiving data for performing the write operation for similar deduplication storage systems in the one or more storage systems.

The operations of method 600 may perform the write operation on the storage device having a largest data chunk size as compared to other storage devices having a smaller data chunk size for dissimilar deduplication storage systems in the one or more storage systems. Alternatively, the write operation may be performed in parallel on each of the storage devices when the storage devices are associated with dissimilar deduplication signatures by calculating the deduplication signature on the storage device having a largest data chunk size and sharing the deduplication signature to storage devices having a smaller data chunk size.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimizing sequential write operations in a data deduplication environment by one or more processors, comprising:
   maintaining similar data deduplication signatures for stored data at all storage devices in one or more storage systems;
   comparing a deduplication signature associated with a write operation to one of the similar data deduplication signatures at a storage device;
   sharing results of the comparison with each of the other storage devices prior to performing the write operation; and
   performing the write operation on the storage device having a largest data chunk size as compared to other storage devices having a smaller data chunk size for dissimilar deduplication storage systems in the one or more storage systems.

2. The method of claim 1, further including:
   determining the deduplication signature for the write operation for comparison to the similar data deduplication signatures; or
   determining the deduplication signature for the write operation by the storage device having the largest data chunk size as compared to other storage devices having the smaller data chunk size.

3. The method of claim 1, further including:
   performing the write operation on a non-deduplicated storage device; or
   performing the write operation on a deduplicated storage device.

4. The method of claim 1, further including:
   performing the write operation on the storage device; and
   transferring the deduplication signature while performing the write operation on the storage device to each of the storage devices prior to receiving data for performing a sequential write operation.

5. The method of claim 1, further including transferring the deduplication signature of the write request to each of the other storage devices prior to receiving data for performing the write operation for similar deduplication storage systems in the one or more storage systems.

6. The method of claim 1, further including performing the write operation in parallel on each of the storage devices when the storage devices are associated with dissimilar deduplication signatures by calculating the deduplication signature on the storage device having the largest data chunk size and sharing the deduplication signature to storage devices having the smaller data chunk size.

7. A system for optimizing sequential write operations in a data deduplication environment, comprising:
   one or more computers with executable instructions that when executed cause the system to:
   maintain similar data deduplication signatures for stored data at all storage devices in one or more storage systems;

compare a deduplication signature associated with a write operation to one of the similar data deduplication signatures at a storage device;

share results of the comparison with each of the other storage devices prior to performing the write operation; and perform the write operation on the storage device having a largest data chunk size as compared to other storage devices having a smaller data chunk size for dissimilar deduplication storage systems in the one or more storage systems.

8. The system of claim 7, wherein the executable instructions:

determine the deduplication signature for the write operation for comparison to the similar data deduplication signatures; or determine the deduplication signature for the write operation by the storage device having the largest data chunk size as compared to other storage devices having the smaller data chunk size.

9. The system of claim 7, wherein the executable instructions:

perform the write operation on a non-deduplicated storage device; or perform the write operation on a deduplicated storage device.

10. The system of claim 7, wherein the executable instructions:

perform the write operation on the storage device; and transfer the deduplication signature while performing the write operation on the storage device to each of the storage devices prior to receiving data for performing a sequential write operation.

11. The system of claim 7, wherein the executable instructions transfer the deduplication signature of the write request to each of the other storage devices prior to receiving data for performing the write operation for similar deduplication storage systems in the one or more storage systems.

12. The system of claim 7, wherein the executable instructions perform the write operation in parallel on each of the storage devices when the storage devices are associated with dissimilar deduplication signatures by calculating the deduplication signature on the storage device having the largest data chunk size and sharing the deduplication signature to storage devices having the smaller data chunk size.

13. A computer program product for optimizing sequential write operations in a data deduplication environment by one or more processors, the computer program product comprising a non-transitory computer-readable storage medium having computer-readable program code portions stored therein, the computer-readable program code portions comprising:

an executable portion that maintains similar data deduplication signatures for stored data at all storage devices in one or more storage systems;

an executable portion that compares a deduplication signature associated with a write operation to one of the similar data deduplication signatures at a storage device;

an executable portion that shares results of the comparison with each of the other storage devices prior to performing the write operation; and an executable portion that performs the write operation on the storage device having a largest data chunk size as compared to other storage devices having a smaller data chunk size for dissimilar deduplication storage systems in the one or more storage systems.

14. The computer program product of claim 13, further including an executable portion that:

determines the deduplication signature for the write operation for comparison to the similar data deduplication signatures; or determines the deduplication signature for the write operation by the storage device having the largest data chunk size as compared to other storage devices having the smaller data chunk size.

15. The computer program product of claim 13, further including an executable portion that:

performs the write operation on a non-deduplicated storage device; or performs the write operation on a deduplicated storage device.

16. The computer program product of claim 13, further including an executable portion that:

performs the write operation on the storage device; and transfers the deduplication signature while performing the write operation on the storage device to each of the storage devices prior to receiving data for performing a sequential write operation.

17. The computer program product of claim 13, further including an executable portion that transfers the deduplication signature of the write request to each of the other storage devices prior to receiving data for performing the write operation for similar deduplication storage systems in the one or more storage systems.

18. The computer program product of claim 13, further including an executable portion that performs the write operation in parallel on each of the storage devices when the storage devices are associated with dissimilar deduplication signatures by calculating the deduplication signature on the storage device having the largest data chunk size and sharing the deduplication signature to storage devices having the smaller data chunk size.

* * * * *